(12) United States Patent
Sabin et al.

(10) Patent No.: US 9,246,934 B2
(45) Date of Patent: Jan. 26, 2016

(54) METHOD AND SYSTEM OF ATTACK SURFACE DETECTION

(71) Applicants: Jason Allen Sabin, Lehi, UT (US); Paul Tiemann, Orem, UT (US)

(72) Inventors: Jason Allen Sabin, Lehi, UT (US); Paul Tiemann, Orem, UT (US)

( * ) Notice: Subject to any disclaimer, the term of this patent is extended or adjusted under 35 U.S.C. 154(b) by 0 days.

(21) Appl. No.: 13/895,147

(22) Filed: May 15, 2013

(65) Prior Publication Data

US 2014/0344937 A1    Nov. 20, 2014

(51) Int. Cl.
*G06F 11/00* (2006.01)
*H04L 29/06* (2006.01)

(52) U.S. Cl.
CPC .................. *H04L 63/1433* (2013.01)

(58) Field of Classification Search
CPC ..... H04L 63/1408; H04L 63/14; H04L 63/20; H04L 63/1416; H04L 63/1425; H04L 63/1433; H04L 63/1441; H04L 63/145; H04L 63/1475; H04L 63/0823; H04L 63/126; H04L 29/08099
USPC .......... 726/10–11, 22–26; 713/155–157, 173, 713/193; 709/224–225, 229
See application file for complete search history.

(56) References Cited

U.S. PATENT DOCUMENTS

| | | | |
|---|---|---|---|
| 8,065,725 B2* | 11/2011 | Zheng et al. | 726/22 |
| 8,220,063 B2* | 7/2012 | Ting | 726/29 |
| 8,683,052 B1* | 3/2014 | Brinskelle | 709/228 |
| 8,763,085 B1* | 6/2014 | Durie et al. | 726/3 |
| 2014/0095866 A1* | 4/2014 | Grebennikov et al. | 713/156 |

* cited by examiner

*Primary Examiner* — Hosuk Song
(74) *Attorney, Agent, or Firm* — Rasmussen Shapiro, PLLC

(57) ABSTRACT

The invention comprises a method of using sensor agents to collect information in a central location to determine the entire attack surface of all certificate based resources, which includes vulnerable, insecure, or unknown resources but also includes where all the secure resources are located and the attack surface for each certificate resource. If a vulnerable resource is detected, the system may initiated additional sensor agents to determine the threat caused by the vulnerability. The system can also assign a rating to the overall security of the network based on vulnerabilities and display the attack surface as a topographic format for easy review by administrators.

24 Claims, 4 Drawing Sheets

METHOD AND SYSTEM OF ATTACK SURFACE DETECTION

BACKGROUND

Companies install certificates throughout their network, including virtual networks, private networks, physical networks, cloud networks. Each network may use one or more types of certificate resources to secure communication and information. Companies today don't have the ability to determine what their attack surface for all their secure certificate resources are.

Security administrators have difficulty determining where a malicious user or hacker will try to access a system. A hacker will look for insecure, vulnerable resources to try and break into. Therefore, these is a need for an easy way to identify the attack surface of certificate resources and use that listing to watch, isolate, and monitor certificate resources.

SUMMARY OF THE INVENTION

The invention uses sensor agents to evaluate network risks and discover vulnerabilities. As certificate resources are discovered, the sensor agents determine the security of the resource by executing a series of tests and scans. If a vulnerable resource is discovered, it is logged in a repository. The system may then provision additional sensor agents to determine the extent and potential impact of the vulnerability.

The information is uploaded to a repository where it can be analysed by the system to create a map of the network's attack surface, particularly a map of the certificate resources that can be used in an attack. The map of the attack surface can be provided to a system administrator for remediation. The sensor agent may automatically or prompt the administrator to apply a patch and may assign threat ratings to each vulnerable resource. Administrators can use the threat rating to deal with the most severe vulnerabilities first.

DESCRIPTION OF INVENTION

The invention discloses a method and system for using sensor agents to create a map of certificate resources to determine an attack surface for network resources and detect potential phishing attacks. The invention ensures that this information is maintained confidentially by ensuring only authenticated users have access to the data.

The provided Figures illustrate various embodiments of the invention; however, the invention is not limited to the specific implementation shown in the Figures, as several of the steps and components are optional or intended only to increase performance, ease of use, and security of the overall system. A component, as used herein, may refer to a software package, virtual appliance, system, or other apparatus or process that can perform the described function.

Figure 1:
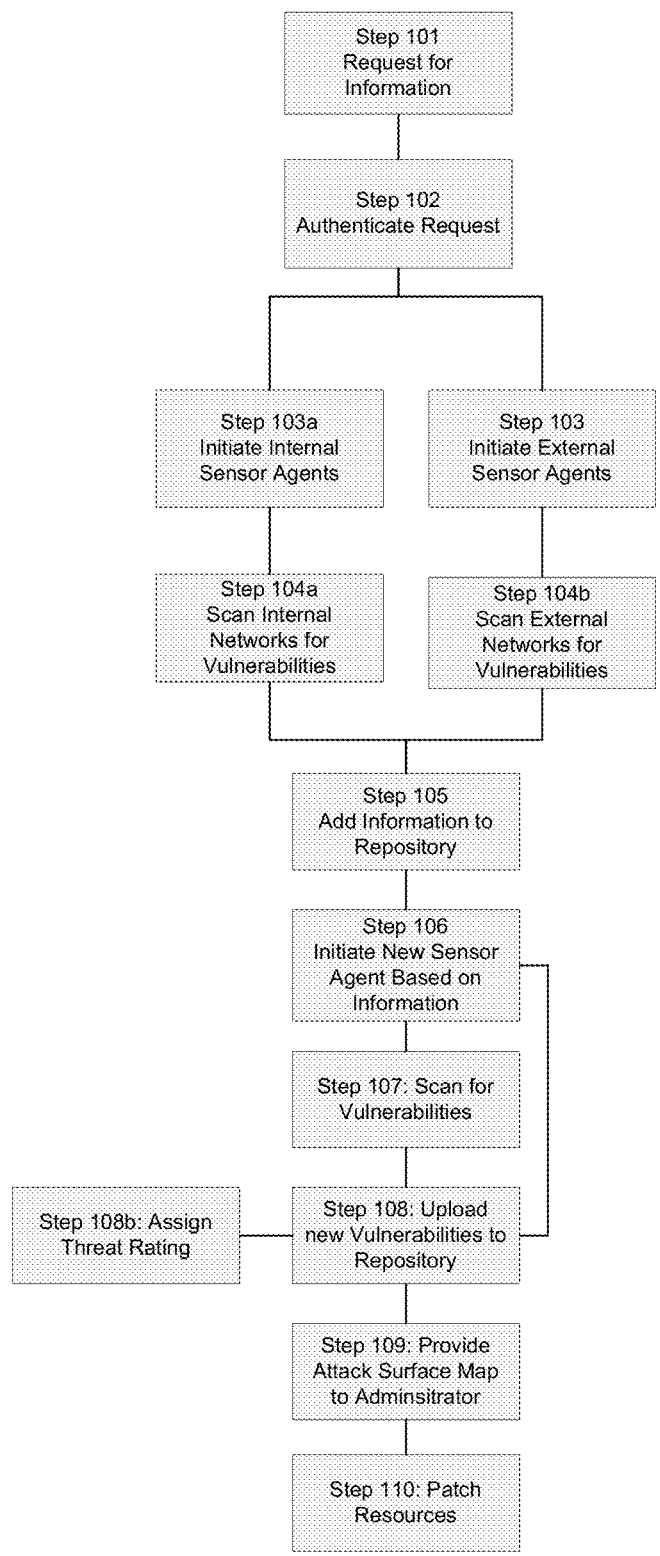
FIG. 1 is a flowchart showing the process used to detect attack surfaces.
Figure 2:
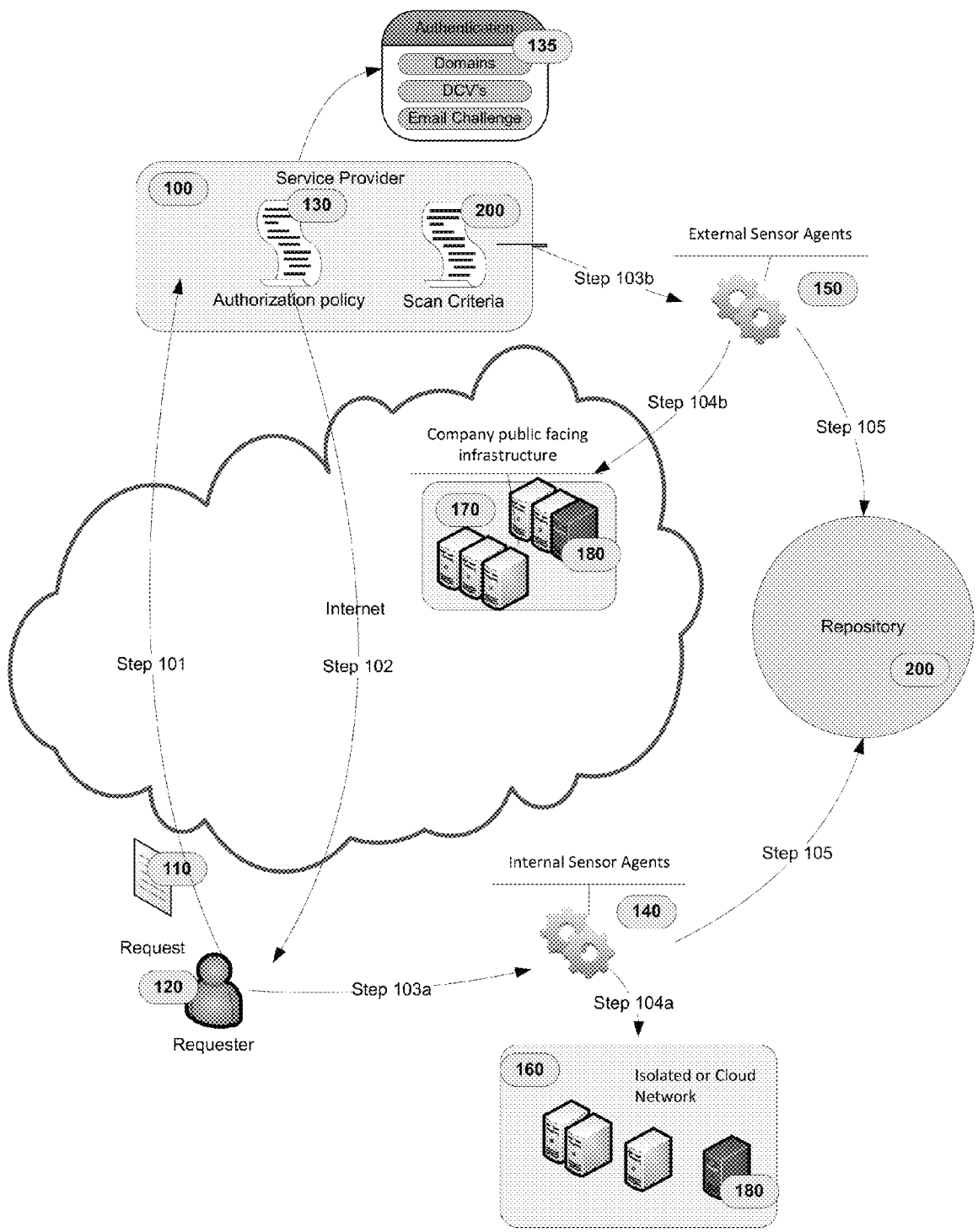
FIG. 2 is a diagram showing the components used to discover vulnerable resources.

In Step 101 of FIG. 1 and as depicted in FIG. 2, a service provider 100, such as a Certification Authority or Cloud-based services provider, receives a request 110 for information about the attack surface associated with a network or organization, which may include one or more public facing infrastructures 170 and one or more isolated, virtual, and internal networks 160.

In Step 102, the service provider authenticates the request and determines whether the requester 120 is authorized to request such information. The request is authenticated using checks and processes set by the service provider's policies 130 but may include verifying the requester's control of the network using a domain challenge or through a WHOIS lookup. The requester's authorization may be pre-determined before receiving a request or be determined when the request occurs.

In Step 103, if the requester is authorized, any combination of internal sensor agents 140 are initiated to scan internal or isolated networks and systems 160 and external sensor agents 150 are initiated to scan public facing networks and systems 170. Alternatively, the scans can be initiated on a set schedule or initiated by a remote machine. The external and internal sensor agents may be the same sensors or separate sensors. The sensor agents are looking for unknown, insecure, or vulnerable certificate resources 180 (hereafter referred to collectively as "vulnerable resources"). Using multiple sensor agents permits the service provider to concurrently scan of multiple networks of an organization. At least one internal sensor agent 140 (a sensor agent located on a server with internal network access) should initiate to ensure that the entire network, and any internal DMZ or isolated network 160, is scanned. Additional sensor agents are also necessary because networks are typically isolated from each other. One sensor might not be sufficient because of routers, firewalls, or other network access control implementations. Internal sensors can be placed at various places in a network to ensure that all certificate resources within a network segment are properly evaluated. Examples of sensor agents include certificate crawlers, malware scanners, and similar vulnerability detection processes and software.

The sensor agents can be pre-installed, such as an application installed on a local or remove server, install during runtime, such as to a cloud server or virtual appliance, or be hardware devices or virtual appliances. The criteria for identifying vulnerable resources 180 depend on the service provider and nature of the sensor agent. The service provider or sensor agent can pull the criteria from listserves that have information on identifying and reporting vulnerabilities, use their own set of criteria, or mix various sources. Examples of vulnerable resources include certificates with low bit key lengths, compromised encryption algorithms, malformed certificate fields or information, improper information, low validation requirements, etc.

In Step 105, throughout the scanning process, the sensor agents return information about vulnerable resources to a repository 200. This information will include listings on the vulnerable resources, including vulnerable certificates and devices made vulnerable by a detected certificate Optionally, the sensor agent could return all resource information, including configuration, installation, and content information, to a cloud repository. The cloud repository can then sift through the data and determine what constitutes a vulnerable resource. Using this option will shift the CPU cycle expense to the cloud operator and will avoid having to constantly update the sensor agents as new vulnerabilities are identified.

The repository may be maintained by the service provider or located within the requester's network. The information should include the location of the vulnerable resource in relation to the network or organization being scanned along with an identifier indicating the vulnerabilities associated with the resource. Additional returned information may include a copy of the certificate resource, subject information, serial numbers, time and date information, and configuration information.

Figure 3:
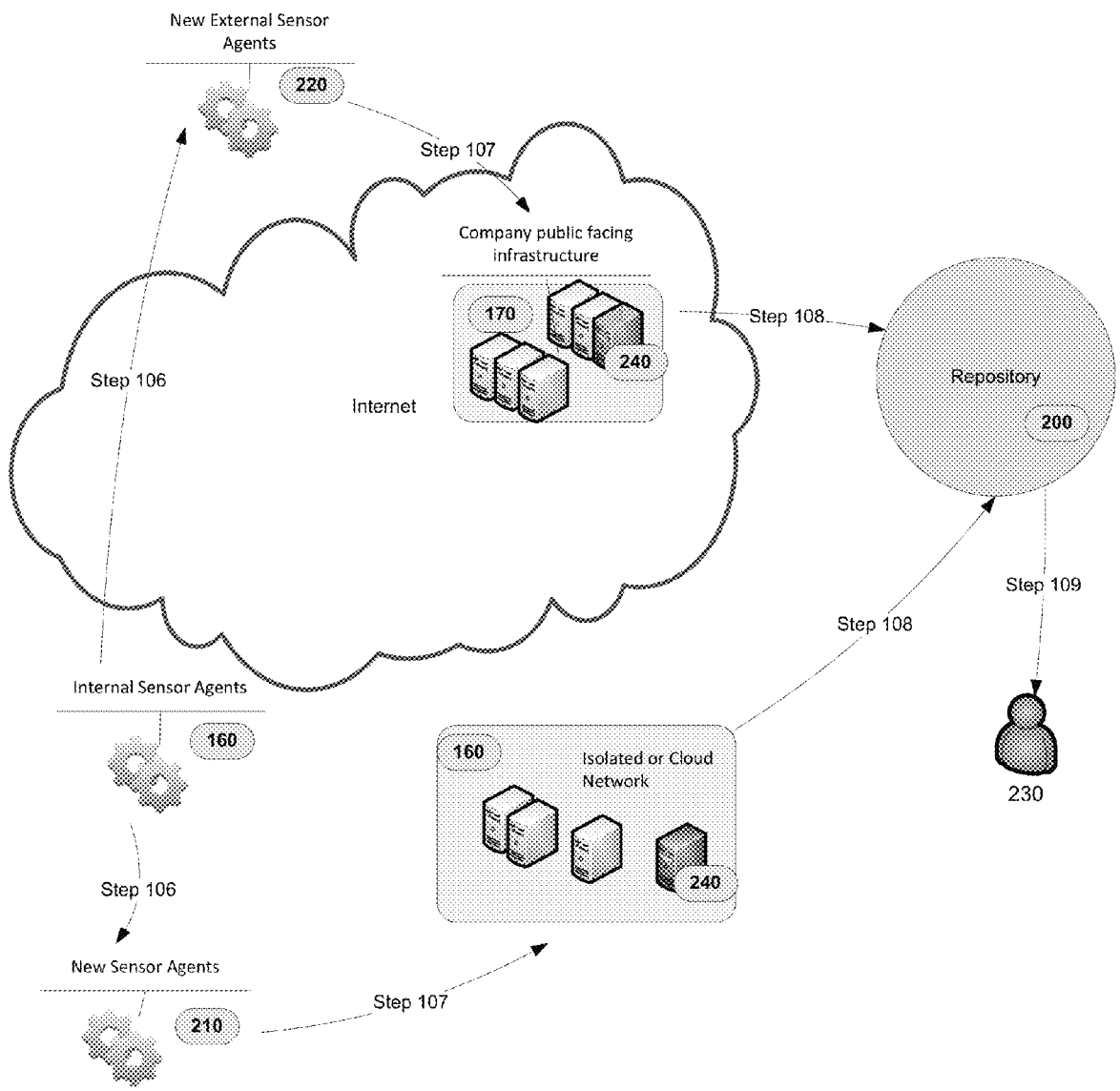
FIG. 3 is a diagram showing the components used to create an attack map using a discovered vulnerable resource.
Figure 4:
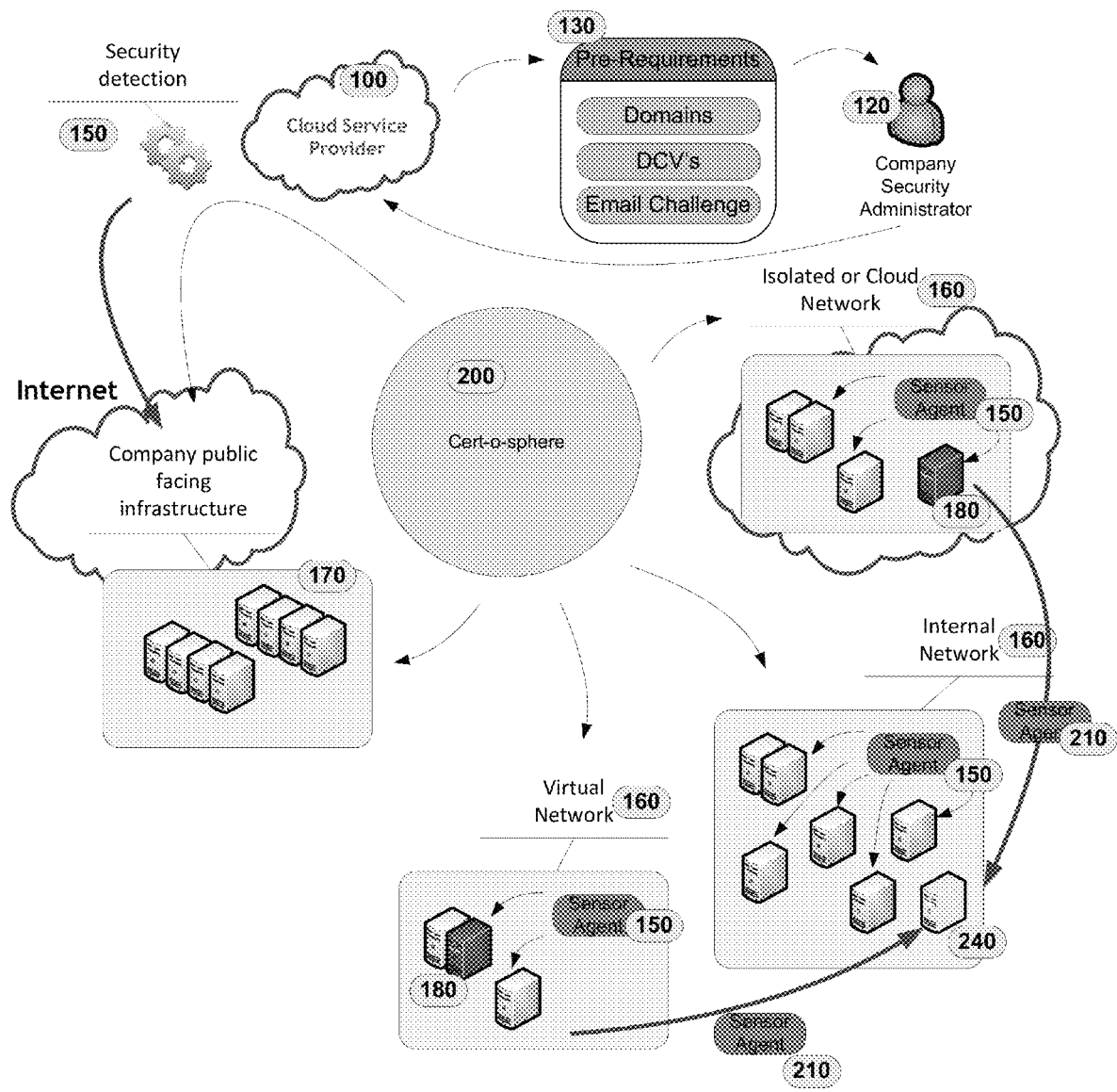
FIG. 4 is a separate embodiment of the invention shown in FIG. 2 and FIG. 3.

As shown in FIG. 3, the sensor agent (or a new or separate sensor agent) can use the discovered vulnerable resource to determine the impact of the vulnerability on the network. In Step 106, a sensor agent detecting a vulnerability or the service provider can initiate new internal sensor agents 210 and external sensor agents 220 based on the type of vulnerability discovered (eg, a malware detection sensor agent for vulnerable resources caused by malware or an intrusion probe for a vulnerability caused by a misconfigured resource). The service provider can initiate the appropriate sensor agent and establish secure tunnel to the network to perform internal scans or use the vulnerable resource to breach the network through an external scan.

In Step 107, the new sensor agents try to communicate with the network and machine hosting the vulnerable resource using the detected vulnerability. The new sensor agents may also attempt to detect new vulnerabilities on related or previously scanned systems using the previously detected vulnerability 240. This may include looking for ports left open because of the vulnerability or by exploiting the misconfigured resource to gain access to otherwise secure areas.

External sensor agents scan in a similar fashion to determine whether any supposedly internal certificate resources are actually publically facing. Discovering an exposed internal resource could mean that the network's security is improperly configured or that the server is exposing potentially confidential information to the entire network. The new external sensor agents scan an organization's public facing infrastructure to ensure that only public information is discoverable.

Because sensor agents are running throughout the network, some consolidation needs to occur to properly identify the scope of vulnerabilities. If an incorrectly configured server is identified a vulnerable, the vulnerable resource might also be detected by sensor agents running on separate machines or from separate networks. This helps map the attack surface and determines the seriousness of a vulnerability, since a vulnerability that is rampant throughout the system impacts more networks than one only detectable from a single machine. A vulnerable resource only on a virtual network and unavailable to other sensors is a lower priority than one that every sensor agent detects and reports. Vulnerabilities detected by external sensor agents are especially concerning and should be flagged as critical for any reviewing administrator.

The new sensor agents continue to upload information to the repository as new vulnerabilities are discovered. The sensor agents can also upload information about the extent of a discovered vulnerability's impact on a network or system, such as information about affected resources, information made public, and the systems at risk for an attack. If new vulnerable resources 240 are detected during the process, the sensor agents repeat the process by initiating additional sensor agents that perform scans and upload additional information about the discovered vulnerabilities. Performing various tests on each vulnerable resource ensures that the repository will contain a complete set of information on the vulnerable resources.

The sensor agents may also return information to the repository about network resources, such as information about resources previously unknown to the service provider or that may not be identified in the original request. These resources are not necessarily insecure. However, they may be impacted by other vulnerabilities and should be scanned by the sensor agents when detected. The repository provides this information to the administrator along with the vulnerability information to help the administrator understand the extent of their network and show all systems and networks exposed by the vulnerable resource. The collection of vulnerable and discovered information acts as a map of the holes and extent of the holes in the existing system. This map could be displayed as a topographic map of the network and the related vulnerabilities. Administrators can use this information to evaluate the impact of system changes and determine how to minimize the potential risks associated with their network. Administrators can also this information to view historical details of a network's security and identify events that cause security concerns.

As an example, during a scan, a sensor agent may discover a security issue in a certificate resource that causes a potential compromise of the network's firewall. After discovering the vulnerable resource, the sensor agent reports the vulnerable resource to the repository and initiates a new sensor agent that attempts to penetrate the firewall using the vulnerable resource. The extent of this penetration is mapped and any new resources discovered during the penetration test are scanned for additional vulnerabilities. New vulnerabilities would launch new sensor agents until all certificate resources are mapped and logged. The system would then display this information to a system administrator, showing exactly how far the one vulnerable resource let the service provider penetrate the network.

During the scan, the system can assign a threat rating to each of the discovered vulnerabilities. This threat rating can be modified as the additional sensor agents discover the extent of the vulnerability and whether other systems are affected by the vulnerability. The threat rating may contain information about the severity of the vulnerability, the extent of the attack vector, and the information that may be compromised if a successful attack occurred. This information is provided to the system administrator to help the administrator recognize the largest area of concern and prioritize remediation.

In addition, the system can patch vulnerable resources as they are detected or at the request of the system administrator. The patch system may download software patches from third party sources or may cause a sensor agent to reconfigure the affected vulnerable resource.

Although the invention has been described with reference to certain embodiments, the patent is not limited to the exact details of the detailed description. Anyone skilled in the art will appreciate that numerous changes and modifications may be made to the preferred embodiments of the invention without departing from the true spirit of the invention. The claims should be construed to cover equivalent variations of the described invention.

What is claimed is:

1. A method of creating an attack surface that maps threats to a network arising from the properties of unsecure, or vulnerable digital certificates ("certificates") comprising:
   a. utilizing sensor agents to scan a network for digital certificates,
   b. where certificates are discovered, instructing sensor agents to scan located certificates to determine if the certificate properties are secure or vulnerable,
   c. where certificates with unsecure or vulnerable properties are discovered, determining the size of the threat to the network posed by the vulnerable certificates, d. creating an attack surface of the network based on the information provided by the sensor agents about the certificate properties.

2. A method according to claim 1, where an organization makes a request to a service provider, such as a certificate authority, to scan the organization's network for the purposes of discovering certificate property information and creating an attack surface based on the information learned therein.

3. A method according to claim 2, where the service provider authenticates the request from the organization to determine the organization's authority over the network and the certificates within the network:
   a. using a verification engine,
   b. following the service provider's established checks and processes, and
   c. verifying the requesting organizations' control of the network using methods such as, but not limited to, a domain challenge and/or a WHOIS search.

4. A method according to claim 1, where, upon authorization of the requesting organization, internal sensor agents scan internal networks within the organization and external sensor agents scan public facing networks of the organization to locate certificates.

5. A method according to claim 4, where, after the sensor agents locate the certificates, additional sensor agents scan the properties of located certificates.

6. A method according to claim 4, where certificate property information obtained by the sensor agents is sent to and collected in a repository dedicated to compiling certificate property information.

7. A method according to claim 1, where the security or vulnerability of the certificate property information of the certificate is determined by employing a module in the repository.

8. A method accord to claim 7, where employing a module in the repository includes initiating a sensor agent to determine if the certificate properties are vulnerable or insecure.

9. A method according to claim 8, where another sensor agent uses any detected vulnerabilities in the certificate properties to scan the entire network to determine the extent of the vulnerability within the network.

10. A method according to claim 1, comprising using information about the certificate properties in the network, including any vulnerabilities or insecurities detected about certificate properties, to prepare an attack surface of the network.

11. A method according to claim 10, where information about the certificate properties provided by the attack surface is displayed as a topographic map of the network.

12. A method according to claim 11, where certificate property information provided by the attack surface is provided to a network administrator.

13. A method for creating an attack surface that maps threats to a network based on missing, unsecure, or vulnerable certificates comprising:
   a. initializing sensor agents to scan a network for certificates
   b. utilizing sensor agents to scan located certificates for information about the certificate properties,
   c. where sensor agents locate properties that are unsecure or vulnerable in the certificate, enabling the sensor agents to flag the certificate,
   d. creating an attack surface of the network based on any missing certificates or any unsecure and vulnerable properties found in the certificate by the sensor agents.

14. A method according to claim 13, further comprising assigning a rating to each certificate based on whether the certificate properties are secure or vulnerable.

15. A method according to claim 13, where sensor agents scan the network for additional certificates that possess the same vulnerabilities as the vulnerability found in a located certificate.

16. A method according to claim 13, where sensor agents use vulnerabilities in certificates to breach the network containing the certificates.

17. A method according to claim 13, where creating the attack surface of the network comprises using information provided by the sensor agents from the certificates in the network.

18. A system for determining the attack surface of a network based on the certificates and certificate properties in the network comprising:
   a. a sensor agent module configured to utilize one or more sensor agents to scan a network for digital certificates and, for at least of the discovered certificates, to identify insecurities or vulnerabilities in the certificate's properties;
   b. a repository module configured to store the collected information about certificate properties; and
   c. an attack surface generation module configured to generate an attack surface of the network based on the information provided by the sensor agents about the certificate properties.

19. The system of claim 18, wherein the sensor agent module is further configured to initiate a second sensor agent to identify vulnerabilities in a certificate's properties after an initial sensor agent identifies a certificate in the network.

20. The system of claim 19, further comprising a rating module configured to rate the security of the certificate properties of a network.

21. The system of claim 20, wherein the rating module is further configured to modify the rating of the security of the certificate properties of a network as one or more sensor agents discover the extent of the vulnerabilities in certificate properties throughout the network and whether other systems may be at risk from the vulnerabilities in certificate properties.

22. The system of claim 19, further comprising a patching module configured to patch insecurities or vulnerabilities in certificate properties as the system detects them or may patch them at the request of a system administrator.

23. The system of claim 19, further comprising a display module configured to display the vulnerabilities located in the certificate properties as an attack surface of the network.

24. The system of claim 19, wherein the repository module is located remotely from the network comprising the certificates.

* * * * *